UNITED STATES PATENT OFFICE.

WILLIAM AUDLEY MAXWELL AND OSCAR EDSON MEDDAUGH, OF LAKEPORT, CALIFORNIA.

COUGH-SIRUP.

SPECIFICATION forming part of Letters Patent No. 404,422, dated June 4, 1889.

Application filed March 6, 1889. Serial No. 302,123. (No specimens.)

*To all whom it may concern:*

Be it known that we, WILLIAM AUDLEY MAXWELL, a citizen of the United States, and OSCAR EDSON MEDDAUGH, a subject of the Queen of the United Kingdom of Great Britain and Ireland, both residing at Lakeport, in the county of Lake and State of California, have invented a new and useful Composition of Matter to be used as a Medicine for Coughs, Colds, Sore Throat, Bronchitis, and Asthma, of which the following is a specification.

Our composition consists of the following ingredients combined in the proportions stated, viz: fluid extract of eriodictyon glutinosum, called also "yerba santa" or "mountain balm," one and one-half ounce; fluid extract of senega, six drams; fluid extract of squills, one and one-fourth dram; spirits of chloroform, one and one-fourth dram; glycerine, two ounces; sirup to make mixture, one pint.

Directions: Shake well before using.

Dose: One tea-spoonful every two or three hours; children, five to fifteen drops, according to age. A dose at bed-time will insure a good night's sleep.

What we claim, and desire to secure by Letters Patent of the United States, is—

The herein-described composition of matter to be used as a medicine, consisting of extract of eriodictyon glutinosum, senega, squills, spirits of chloroform, glycerine, and sirup, in the proportions specified.

WILLIAM AUDLEY MAXWELL.
OSCAR EDSON MEDDAUGH.

Witnesses:
   CHARLES FREMONT FISHBACK,
   THOS. B. BOND.